United States Patent
Chen et al.

(10) Patent No.: US 9,645,768 B2
(45) Date of Patent: May 9, 2017

(54) BYTE ADDRESSABLE STORING SYSTEM

(71) Applicant: Institute For Information Industry, Taipei (TW)

(72) Inventors: Yun-Jhu Chen, Taichung (TW); Tseng-Yi Chen, Taoyuan (TW); Yuan-Hao Chang, Taipei (TW); Hsin Wen Wei, Zhubei (TW); Wei-Kuan Shih, New Taipei (TW); Chia-Heng Tu, New Taipei (TW)

(73) Assignee: Institute For Information Industry, Taipei (TW)

( * ) Notice: Subject to any disclaimer, the term of this patent is extended or adjusted under 35 U.S.C. 154(b) by 155 days.

(21) Appl. No.: 14/555,329

(22) Filed: Nov. 26, 2014

(65) Prior Publication Data

US 2016/0048335 A1 Feb. 18, 2016

(30) Foreign Application Priority Data

Aug. 15, 2014 (TW) .............................. 103128074 A (51) Int. Cl.
 *G06F 12/00* (2006.01)
 *G06F 3/06* (2006.01)
 *G06F 17/30* (2006.01)

(52) U.S. Cl.
 CPC .......... *G06F 3/0673* (2013.01); *G06F 3/0608* (2013.01); *G06F 3/0643* (2013.01); *G06F 17/30312* (2013.01)

(58) Field of Classification Search
 CPC .... G06F 3/0673; G06F 3/0608; G06F 3/0643; G06F 17/30312
 See application file for complete search history.

(56) References Cited

U.S. PATENT DOCUMENTS

2006/0282644 A1* 12/2006 Wong .................. G06F 12/0246
 711/206

OTHER PUBLICATIONS

M.K. McKusick, W.N. Joy, S.J. Leffler, R.S. Fabry, A Fast File System for UNIX. Feb. 18, 1984, 14 pages.
A. Mathur, M. Cao, S. Bhattacharya, A. Dilger, A. Tomas, L. Vivier, The new ext4 filesystem: current status and future plans. Linux Symposium (2007), vol. 2, Jun. 27-30, 2007, 16 pages.

\* cited by examiner

*Primary Examiner* — Larry Mackall
(74) *Attorney, Agent, or Firm* — Skaar Ulbrich Macari, P.A.

(57) ABSTRACT

A byte addressable storing system is provided. The byte addressable storing system includes a data transmission interface and a processing unit. The data transmission interface connects to a byte addressable storing device. The processing unit creates a primary metadata table, a secondary metadata table, an indirect metadata matching table, a sub-block using status table and a metadata pointer in the byte addressable storing device via the data transmission interface. The processing unit further adjusts the allocation of metadata in the byte addressable storing device dynamically based on the aforesaid tables and pointer. The processing unit further stores a file into sub-blocks of blocks non-sequentially, and achieves record of the file via dynamic multi-level pointing.

6 Claims, 10 Drawing Sheets

BYTE ADDRESSABLE STORING SYSTEM

PRIORITY

This application claims priority to Taiwan Patent Application No. 103128074 filed on Aug. 15, 2014, which is hereby incorporated herein by reference in its entirety.

FIELD

The present invention relates to a byte addressable storing system, and more particularly, to a byte addressable storing system for a byte addressable storing device.

BACKGROUND

In the prior art, an index-type file system usually divides the storing region of a storing device into a metadata storing region and a data storing region. The metadata storing region is used to store metadata corresponding to the number of files, and the data storing region is sub-divided into data blocks of a fixed block size.

When a file is to be stored, firstly a single metadata and a plurality of data blocks are allocated to this file. The single metadata is mainly used to record attributes of the file (e.g., whether it is readable and writable, the user, the group to which it belongs, the accessing time and etc.) and locations of the data blocks in the storing device. Accordingly, each file has a single metadata and at least one data block corresponding to this file.

However, for such a file system structure, there is a problem that, if the number of small-sized files is too great, the metadata storing region might become insufficient due to the great number of metadata while the data storing region is still in surplus. Similarly, if the number of large-sized files is too great, the data storing region might become insufficient while the metadata storing region is still in surplus due to the small number of metadata. Obviously, such a file system leads to a poor average utilization efficiency of the storing device.

Further, the data blocks divided in the data region is fixed instead of being variable in such a file system. Therefore, in case of a file which has a size that just exceeds the size of one data block (or a multiple thereof), then the system must allocate an additional data block to this file. Because the additionally allocated data block is only used to store a small amount of data and the remaining space cannot be used for other files, a waste in space will be caused when the number of such files and probabilities of using this storage mechanism increase.

On the other hand, in the conventional storing devices, the file system is designed in such a way that a file must be stored in consecutive block spaces because of the physical property of the devices. Thus, if the file is increased in size due to data variation but the consecutive data block spaces originally used for storing the file becomes insufficient, the file must be moved to incur a cost of file movement.

Accordingly, an urgent need exists in the art to provide a novel file system architecture in which a more efficient file storing mechanism is used in combination with a newly developed storing device to improve the file accessing efficiency and to make an improvement on the drawbacks of the prior art.

SUMMARY

The present invention relates to a byte addressable storing system, which includes a data transmission interface and a processing unit. The data transmission interface is configured to connect with a byte addressable storing device. The processing unit is configured to access the byte addressable storing device via the data transmission interface, and create a first primary metadata table, a first secondary metadata table, a second secondary metadata table and an indirect metadata matching table in the byte addressable storing device.

The first primary metadata table records a first metadata storing status of the first secondary metadata table and a second metadata storing status of the second secondary metadata table. The processing unit is further configured to: determine that the first secondary metadata table has a single used metadata item according to the first metadata storing status; determine that the second secondary metadata table has an unused metadata item according to the second metadata storing status; record the single used metadata item of the first secondary metadata table and the unused metadata item of the second secondary metadata table into the indirect metadata matching table correspondingly; and remove the first secondary metadata table.

The present invention also includes a byte addressable storing system, which comprises a data transmission interface and a processing unit. The data transmission interface is configured to connect with the byte addressable storing device. The processing unit is configured to access the byte addressable storing device via the data transmission interface, and create a first primary metadata table and a first secondary metadata table in the byte addressable storing device. The first primary metadata table records a first metadata storing status of the first secondary metadata table. The processing unit is further configured to: determine that the first secondary metadata table does not have a usable metadata item according to the first metadata storing status; and add a second metadata storing status into the first primary metadata table and create a second secondary metadata table correspondingly.

The present invention further includes a byte addressable storing system, which comprises a data transmission interface and a processing unit. The data transmission interface is configured to connect with the byte addressable storing device. The processing unit is configured to access the byte addressable storing device via the data transmission interface, and define a plurality of blocks in the byte addressable storing device and divide the plurality of blocks into a plurality of sub-blocks. The processing unit is further configured to create a sub-block using status table in the byte addressable storing device to record using statuses of the plurality of sub-blocks of the plurality of blocks. The processing unit is further configured to store a file into the byte addressable storing device according to the sub-block using status table. The file is stored in the plurality of sub-blocks non-sequentially through byte addressing.

The present invention further includes a byte addressable storing system, which comprises a data transmission interface and a processing unit. The data transmission interface is configured to connect with the byte addressable storing device. The processing unit is configured to access the byte addressable storing device via the data transmission interface, and create a metadata in the byte addressable storing device. The metadata has a metadata block pointer, and the metadata block pointer has at least one first pointing field. The processing unit is further configured to: determine a file size of the file, allocate a plurality of blocks of the byte addressable storing device to the file according to the file size, and point the first pointing field to the plurality of blocks. The step of pointing the first pointing field to the plurality of blocks comprises one of the following two steps: directly pointing the first pointing field to one of the plurality of blocks; or pointing the first pointing field to a block table. The block table has a second pointing field. The second pointing field points to one of the plurality of blocks.

The detailed technology and preferred embodiments implemented for the subject invention are described in the following paragraphs accompanying the appended drawings for people skilled in this field to well appreciate the features of the claimed invention.

DETAILED DESCRIPTION

Hereinbelow, the present invention will be explained with reference to certain example embodiments thereof. However, these example embodiments are not intended to limit the present invention to any specific examples, embodiments, environment, applications or implementations described in these example embodiments. Therefore, description of these example embodiments is only for purpose of illustration rather than to limit the present invention.

In the following embodiments and the attached drawings, elements not directly related to the present invention are omitted from depiction; and dimensional relationships among individual elements in the attached drawings are illustrated only for ease of understanding but not to limit the actual scale.

Figure 1A:
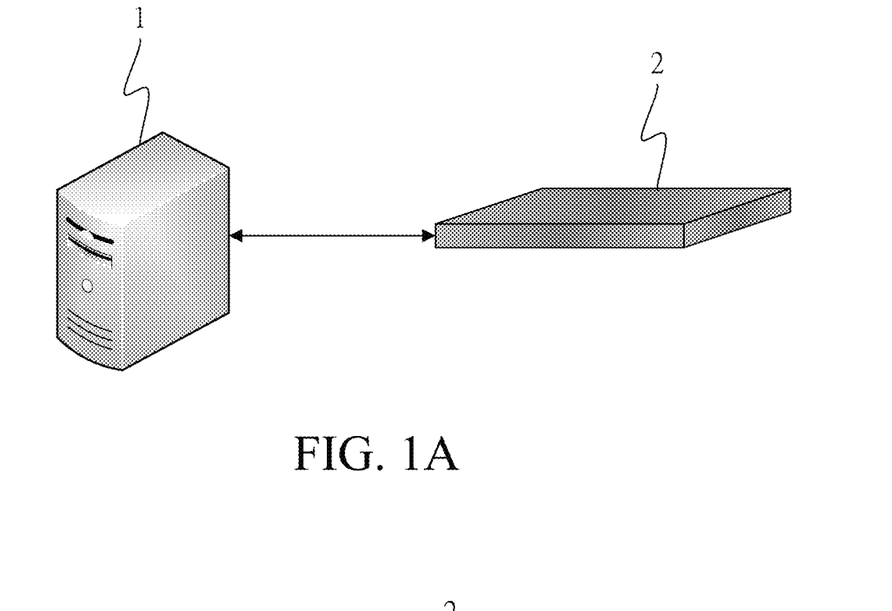
FIG. 1A is a schematic view illustrating the service environment of the byte addressable storing system according to a first embodiment of the present invention.
Figure 1B:
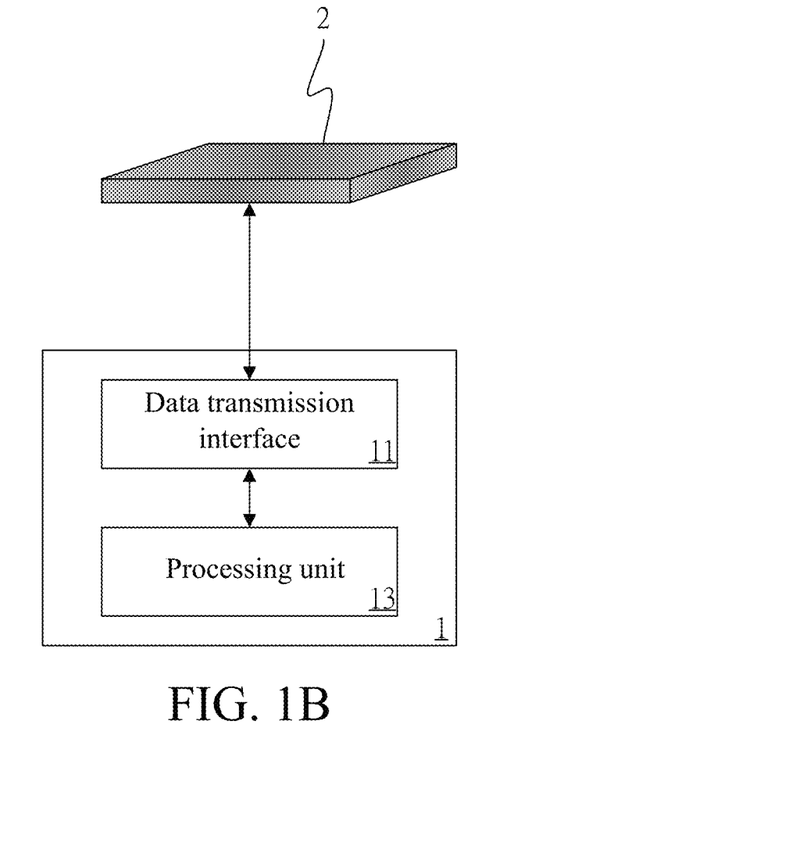
FIG. 1B is a block diagram of the byte addressable storing system according to the first embodiment of the present invention.

Refer to FIG. 1A and FIG. 1B together. FIG. 1A is a schematic view illustrating the service environment of a byte addressable storing system 1 according to a first embodiment of the present invention. The byte addressable storing system 1 is used in a byte addressable storing device 2. FIG. 1B is a block diagram of the byte addressable storing system 1 according to the first embodiment of the present invention. The byte addressable storing system 1 comprises a data transmission interface 11 and a processing unit 13. The data transmission interface 11 connects with the byte addressable storing device 2, and the processing unit 13 is configured to access the byte addressable storing device 2 via the data transmission interface 11. The interactions between elements will be further described hereinbelow. It should be noted that the byte addressable storing system 1 described herein is preferred to be exploited in phase-change memory (PCM), but is not limited to other types of computer memory.

Figure 1C:
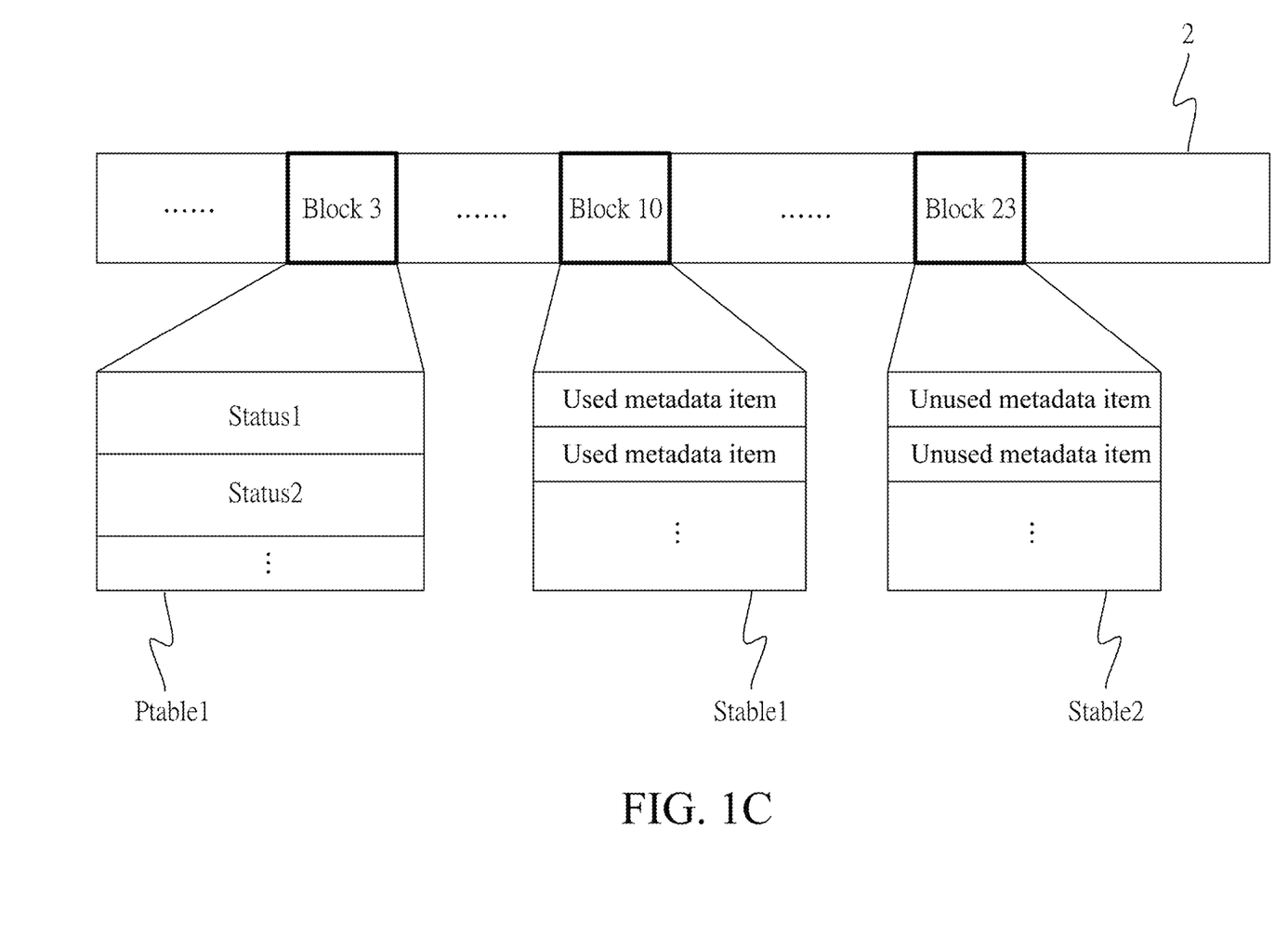
FIGS. 1C and 1D are schematic views illustrating how the byte addressable storing system according to the first embodiment of the present invention processes tables.

Different from the metadata recording mechanism in the prior art, the present invention records metadatas in the form of multi-level metadata tables to facilitate the dynamic addition and recycling of data. Referring also to FIG. 1C, there is shown a schematic view illustrating the byte addressable storing system 1 according to the first embodiment of the present invention processes tables.

Specifically, the processing unit 11 creates a first primary metadata table Ptable1 and a first secondary metadata table Stable1 in the byte addressable storing device 2. The first primary metadata table Ptable1 records a first metadata storing status Status1 of the first secondary metadata table Stable1, and the first secondary metadata table Stable1 records a plurality of metadata items (not depicted). It should be particularly appreciated that, the first primary metadata table Ptable1 and the first secondary metadata table Stable1 may be stored in any of the blocks (e.g., a Block 3 and a Block 10 as shown) of the byte addressable storing device 2, but this is not intended to limit the storing position of the tables in the present invention.

Next, because the first metadata storing status Status1 mainly records using statuses of metadata items of the first secondary metadata table Stable1, the processing unit 13 can determine whether there still is any usable metadata item in the first secondary metadata table Stable1 according to the content of the first metadata storing status Status1 when a file (not depicted) is to be created. If the determination result is "yes", then the unused metadata item will be allocated to the newly-added file; and if the determination result is "no", then a new secondary metadata table will be created.

For example, assume that the metadata items recorded in the first secondary metadata table Stable1 have all been used after a period of time. Then, if a new file is to be created at this moment, the processing unit 13 can determine that the first metadata table Stable1 does not have any usable metadata item according to the content of the first metadata storing status Status1, and then add a second metadata storing status Status1 in the first primary metadata table Ptable1 and create a second secondary metadata table Stable2 in any of the unused blocks (e.g., a Block 23 as shown) of the byte addressable storing device 2. Accordingly, a metadata item in the second secondary metadata table Stable2 can be allocated to the newly-added file.

Figure 1D:
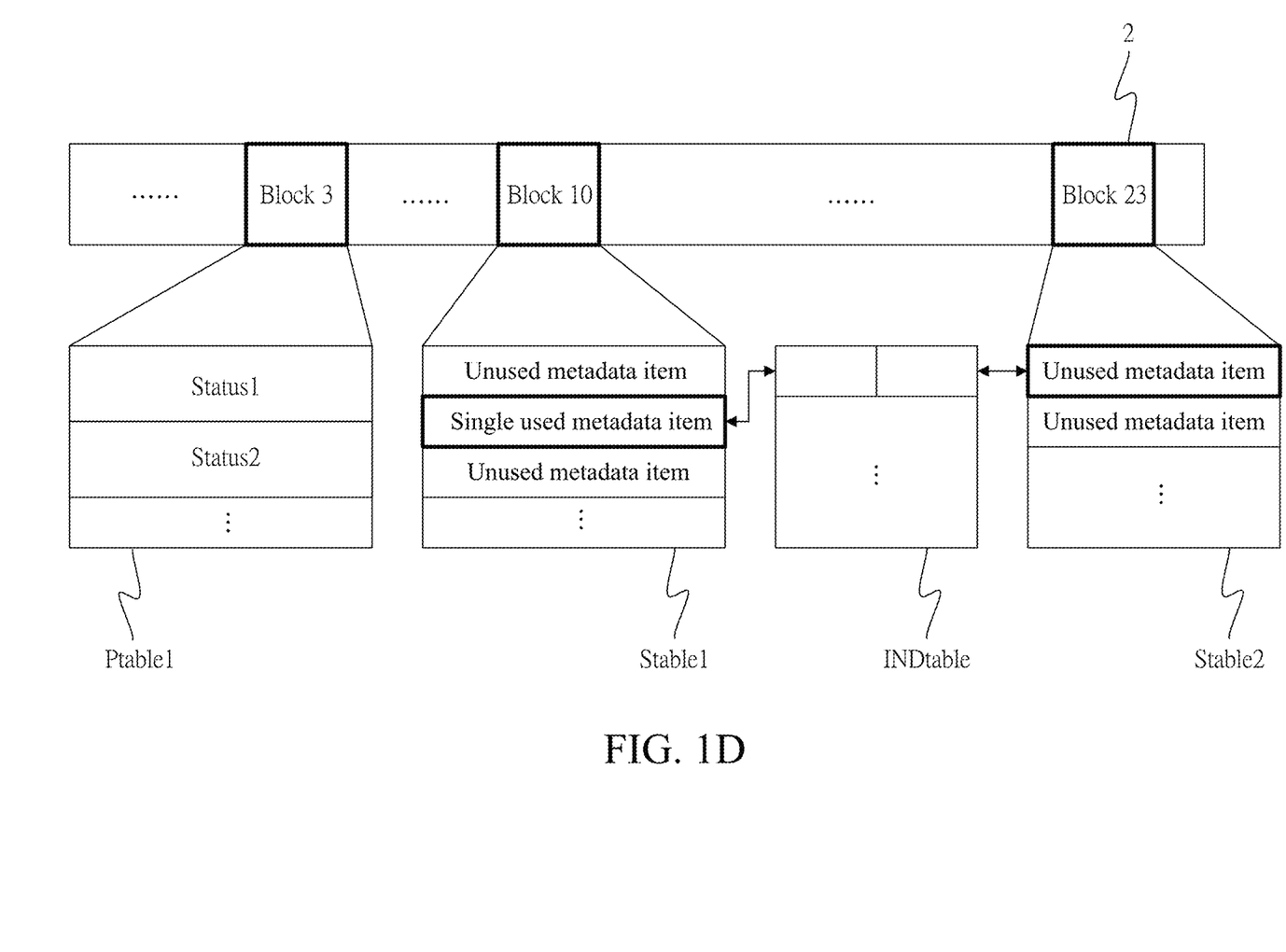

On the other hand, referring also to FIG. 1D, there is shown another schematic view illustrating how the byte addressable storing system 1 according to the first embodiment of the present invention processes tables. Specifically, if the metadata items of the first secondary metadata table Stable1 and the second secondary metadata table Stable2 have been altered after another time period of accessing, the byte addressable storing device 2 can further determine whether it is possible to integrate the metadata items to facilitate the space recycling.

For example, the processing unit 13 determines that the first secondary metadata table Stable1 has a single used metadata item according to the first metadata storing status Status1, and determines that the second secondary metadata table Stable2 has an unused metadata item at the same time. In other words, the first secondary metadata table Stable1 has only one used metadata item, and the second secondary metadata table Stable2 still has an unused metadata item space.

Then, the processing unit 13 further transfers the content of the single used metadata item of the first secondary metadata table Stable1 into the unused metadata item of the second secondary metadata table Stable2, and records the mapping between the single used metadata item of the first secondary metadata table Stable1 and the unused metadata item of the second secondary metadata table Stable2 into an indirect metadata matching table INDtable correspondingly.

Accordingly, in the subsequent accessing process, the processing unit 13 can know, from the content of the indirect metadata matching table INDtable, that the content of the single used metadata item of the original first secondary metadata table Stable1 has been transferred into the unused metadata item of the second secondary metadata table Stable2. Accordingly, the processing unit 13 can remove the first secondary metadata table Stable1 to recycle the space for further use.

Figure 2A:
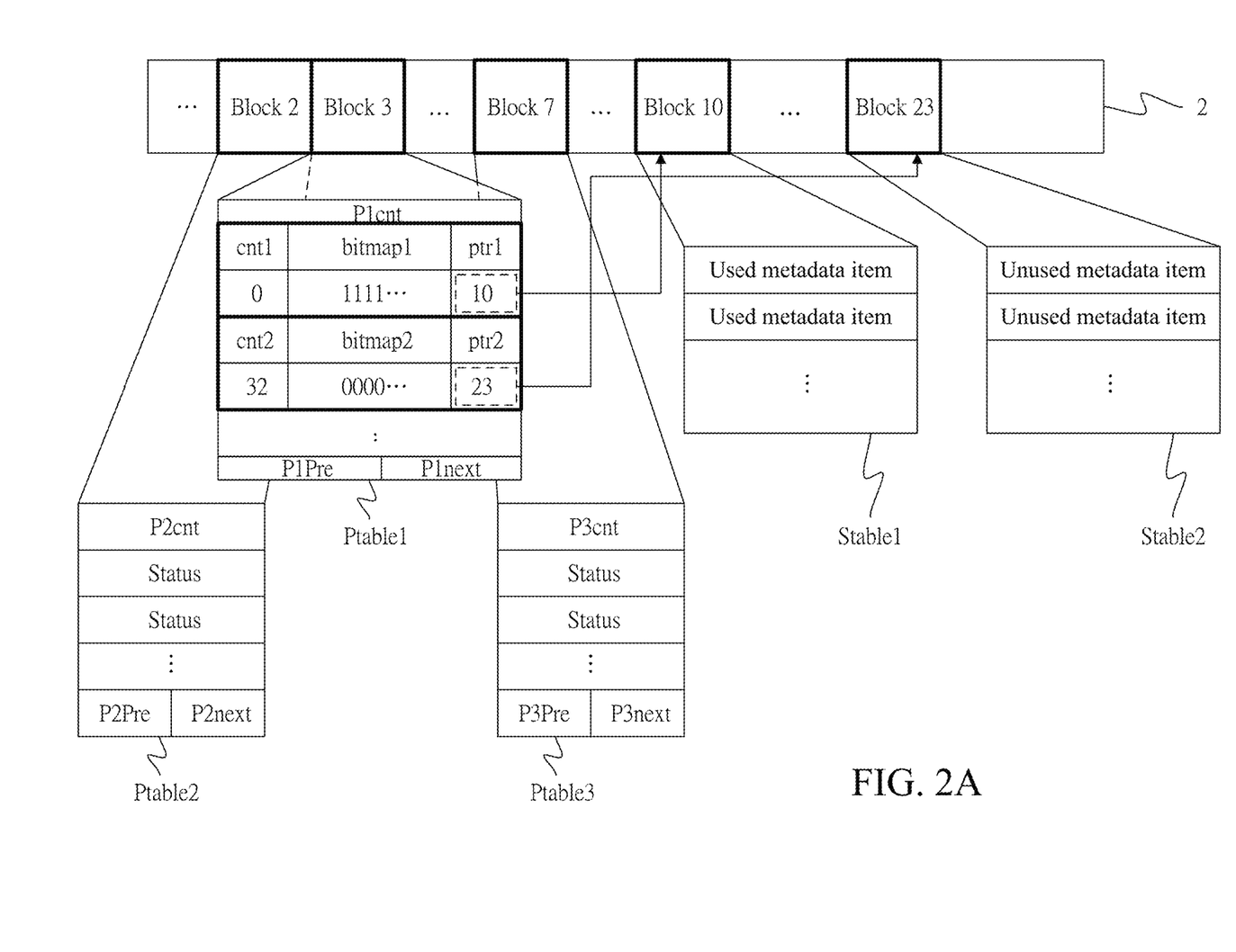
FIGS. 2A and 2B are schematic views illustrating how a byte addressable storing system according to a second embodiment of the present invention processes tables.
Figure 2B:
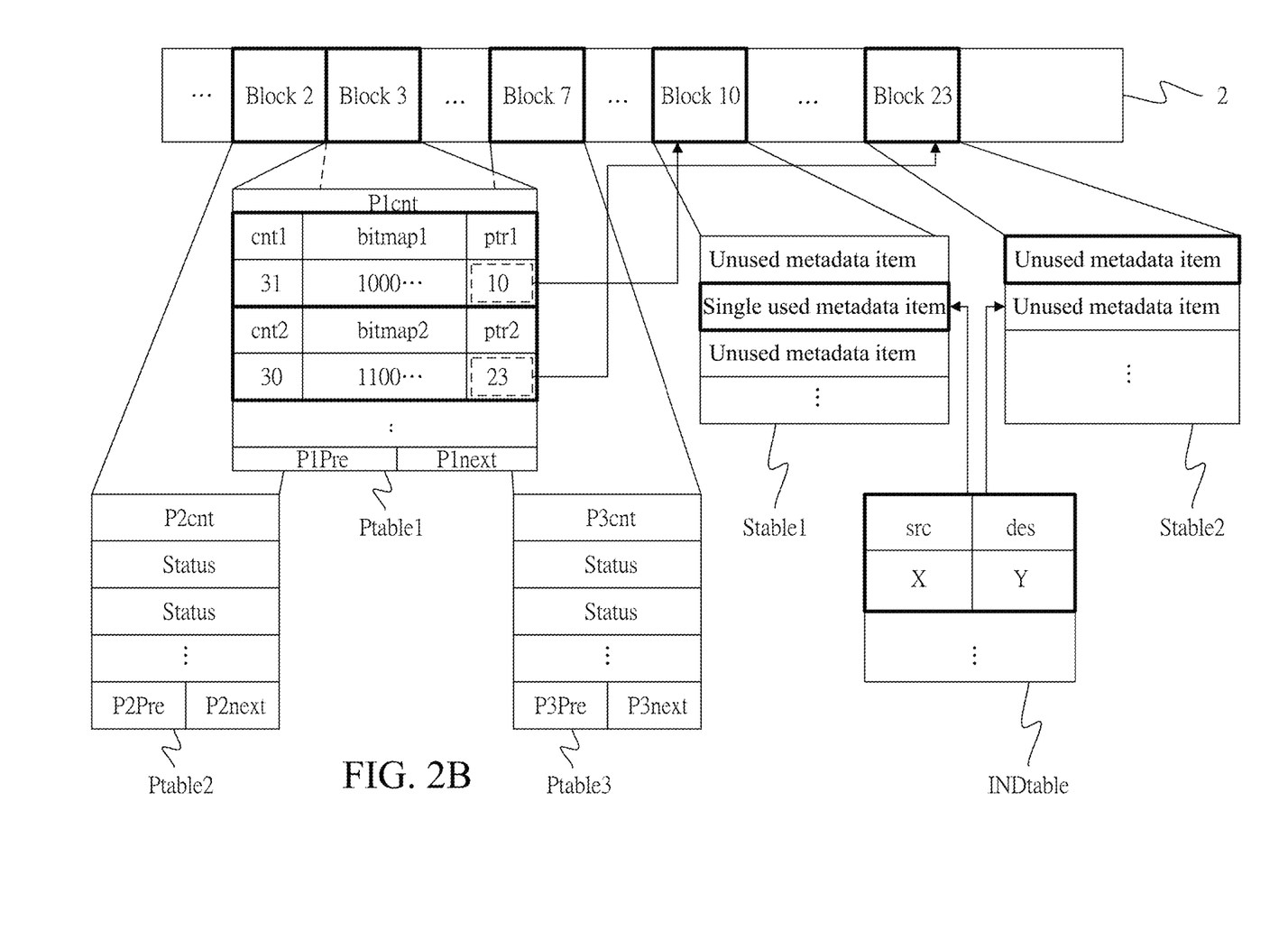

Referring to FIG. 2A and FIG. 2B, there are shown schematic views illustrating how the byte addressable storing system 1 according to a second embodiment of the present invention processes tables. It should be particularly appreciated that, the second embodiment has the same system architecture and connection environment as the aforesaid embodiment, so elements bearing the same reference numerals also have the same functions and will not be further described herein. The second embodiment is mainly intended to describe a more detailed implementation.

Firstly, refer to FIG. 2A. Specifically, the processing unit 13 creates the first primary metadata table Ptable1 and the first secondary metadata table Stable1 in the byte addressable storing device 2. The first primary metadata table Ptable1 records the first metadata storing status Status1 of the first secondary metadata table Stable1, and the first secondary metadata table Stable1 records a plurality of metadata items.

More specifically, the first primary metadata table Ptable1 further comprises a full-domain metadata number field P1cnt, a front data table pointer P1pre and a back data table pointer P1next. The full-domain metadata number field P1cnt is configured to record the number of usable metadata of the byte addressable storing device 2. The front data table pointer P1pre is configured to point to a block (e.g., a Block 2 as shown) for a second primary metadata table Ptable2 in the byte addressable storing device 2, and the back data table pointer P1next is configured to point to a block (e.g., a Block 7 as shown) for a third primary metadata table Ptable3 in the byte addressable storing device 2.

Further, the first metadata storing status Status1 has a first metadata number field cnt1, a first metadata bitmap bitmap1 and a first metadata table block pointer ptr1. The first metadata number field cnt1 is configured to record the number of usable metadata comprised in the first secondary metadata table Stable1. The first metadata bitmap bitmap1 is configured to record metadata using statuses of the first secondary metadata table Stable1. The first metadata table block pointer ptr1 is configured to record a block for the first secondary metadata table Stable1 in the byte addressable storing device.

The second metadata storing status Status2 has a second metadata number field cnt2, a second metadata bitmap bitmap2 and a second metadata table block pointer ptr2. The second metadata number field cnt2 is configured to record the number of usable metadata comprised in the second secondary metadata table Stable2. The second metadata bitmap bitmap2 is configured to record metadata using statuses of the second secondary metadata table Stable2. The second metadata table block pointer ptr2 is configured to record a block for the second secondary metadata table in the byte addressable storing device.

It should be particularly appreciated that, in the second embodiment, each secondary metadata table has 32 usable metadatas. Accordingly, for the first metadata table Stable1 at the very beginning, the first metadata number field cnt1 is 32, the first metadata bitmap bitmap1 is a 32-bit bitmap in which the number 0 and the number 1 are used to represent 32 "unused" and "used" metadata respectively, and the first metadata table block pointer ptr1 is an address value pointer which points to the block for the first secondary metadata table Stable1 in the byte addressable storing device.

Then, similarly, assume that the metadata items recorded in the first secondary metadata table Stable1 have all been used after a period of time and, as a result, the values of the full-domain metadata number filed P1cnt and the first metadata number field cnt1 are both 0 at this moment. Then, if a new file is to be created, the processing unit 13 can determine that the first metadata table Stable1 does not have any usable metadata item, and add a second metadata storing status Status2 into the first primary metadata table Ptable1 and create the second secondary metadata table Stable2 in any of the unused blocks (the Block 23 as shown) of the byte addressable storing device 2.

Similarly, for the second metadata table Stable2 at the very beginning, the second metadata number field cnt2 is 32, the second metadata bitmap bitmap2 is a 32-bit bitmap in which the number 0 and the number 1 are used to represent "unused" and "used" metadatas respectively, and the second metadata table block pointer ptr2 is an address value pointer and points to the block for the second secondary metadata table Stable2 in the byte addressable storing device.

On the other hand, referring also to FIG. 2B, there is shown another schematic view illustrating how the byte addressable storing system 1 according to the second embodiment of the present invention processes tables. Similarly, if the metadata items of the first secondary metadata table Stable1 and the second secondary metadata table Stable2 have been altered after another time period of accessing, the byte addressable storing device 2 can further determine whether it is possible to integrate the metadata items to facilitate the space recycling.

For example, the processing unit 13 determines that the first secondary metadata table Stable1 has a single used metadata item according to the first metadata number field cnt1 of the first metadata storing status Status1, and determines that the second metadata number field cnt2 of the second secondary metadata table Stable2 has at least an unused metadata item at the same time. In other words, the value of the first metadata number field cnt1 is 31, and the value of the second metadata number field cnt2 is not 0.

Then, the processing unit 13 further transfers the content of the single used metadata item of the first secondary metadata table Stable1 into the unused metadata item of the second secondary metadata table Stable2, and records the mapping between the single used metadata item of the first secondary metadata table Stable1 and the unused metadata item of the second secondary metadata table Stable2 into the indirect metadata matching table INDtable correspondingly.

It should be particularly appreciated that, the indirect metadata matching table INDtable has a source address src and a destination address des. The source address src is configured to identify the single used metadata item of the first secondary metadata table Stable1, and the destination address des is configured to identify the unused metadata item of the second secondary metadata table Stable2. In the second embodiment, assume that the single used metadata item of the first secondary metadata table Stable1 is a metadata X, and the unused metadata item of the second secondary metadata table Stable2 is a metadata Y.

Accordingly, in the subsequent accessing process, the processing unit 13 can know, from the content of the indirect metadata matching table INDtable, that the content of the single used metadata item X of the original first secondary metadata table Stable1 has been transferred into the unused metadata item Y of the original second secondary metadata table Stable2. Accordingly, the processing unit 13 can remove the first secondary metadata table Stable1 to recycle the space for further use.

Figure 3:
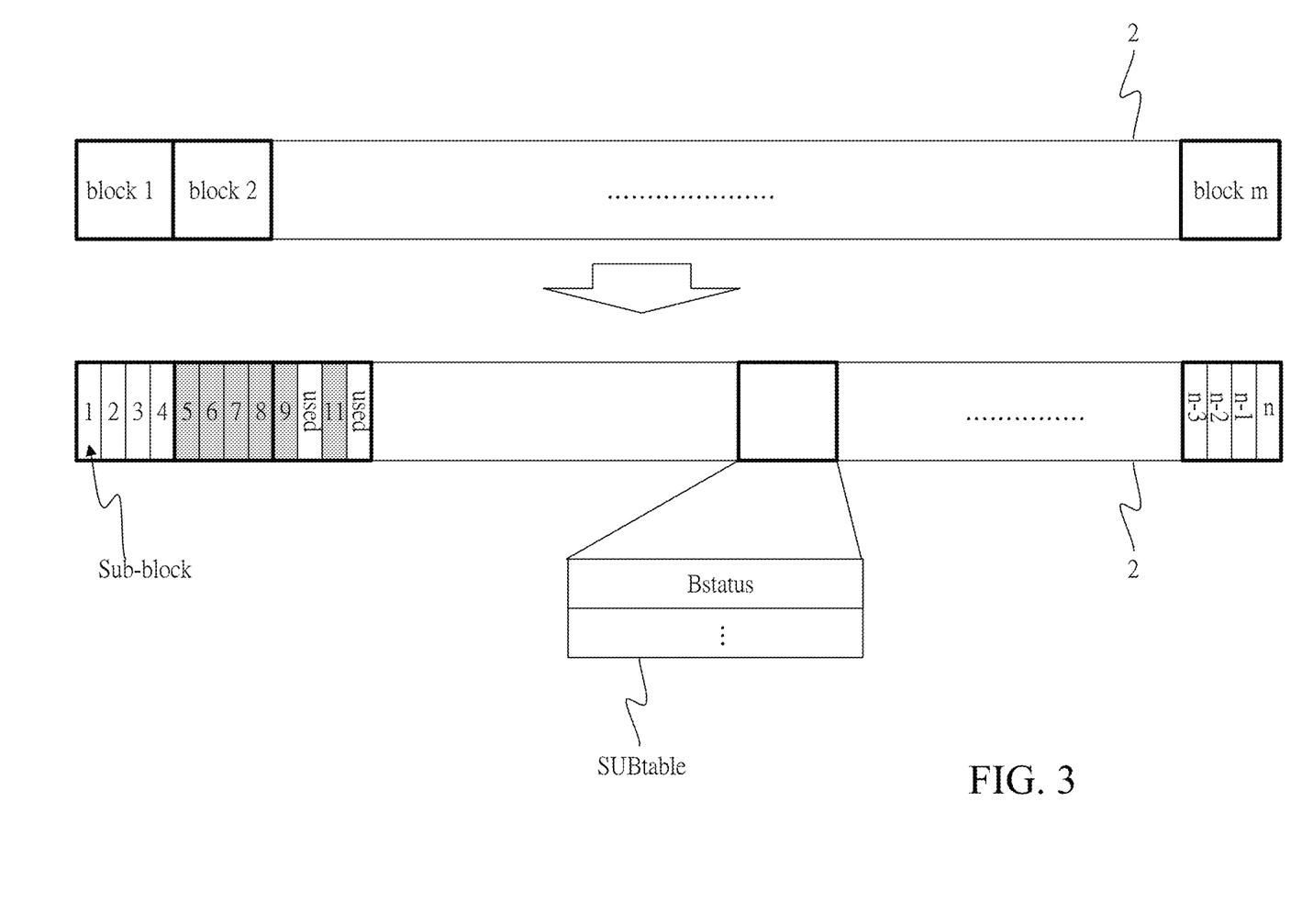
FIG. 3 is a schematic view illustrating how a byte addressable storing system according to a third embodiment of the present invention stores data.

Referring to FIG. 3, there is shown a schematic view illustrating how the byte addressable storing system 1 according to a third embodiment of the present invention stores data. It should be particularly appreciated that, the third embodiment has the same system architecture and connection environment as the aforesaid embodiments. Therefore, elements bearing the same reference numerals have also the same functions and will not be further described herein. The third embodiment is mainly intended to describe how to store data.

It should be firstly appreciated that, in the third embodiment, the processing unit 13 firstly defines a plurality of blocks blocks 1~m in the byte addressable storing device 2, and then divides the blocks blocks 1~m into a plurality of sub-blocks sub-blocks 1~n. Then, the processing unit 13 further creates a sub-block using status table SUBtable in the byte addressable storing device 2 to record using statuses Bstatus of the sub-blocks. It should be particularly appreciated that, the blocks are mainly configured to store data, but they can also store metadata and tables related to the metadata depending on the need of dynamically adjusting the metadata in the aforesaid embodiments. The third embodiment will focus on how to store data.

Further speaking, the sub-block using status table SUBtable is mainly configured to record using statuses of the sub-blocks sub-blocks 1~n, and when there are sufficient consecutive sub-block spaces, the processing unit 13 will directly allocate a file into the consecutive sub-block spaces. However, after a time period of use of the byte addressable storing device 2, inconsecutive sub-block spaces will usually arise in the blocks, and the prior works can not efficiently utilize the inconsecutive sub-block spaces. With the present invention, when the size of a file increases and the increased part of the file can not be stored in consecutive spaces, the processing unit 13 simply needs to store the increased part of data into the sub-blocks non-sequentially without having to shift the storing status of the original file owing to the hardware property of the byte addressable storing device 2.

For example, as shown in FIG. 3, the original file has been stored into the sub-blocks sub-blocks 5, 6, 7, 8, and 9. If the file is increased in size so that an additional sub-block needs to be used, the increased part of the file can be directly stored into a usable sub-block sub-block 11 non-sequentially through byte-addressing. In this way, movement of the original data content can be avoided to greatly reduce the accessing time for the device.

Figure 4A:
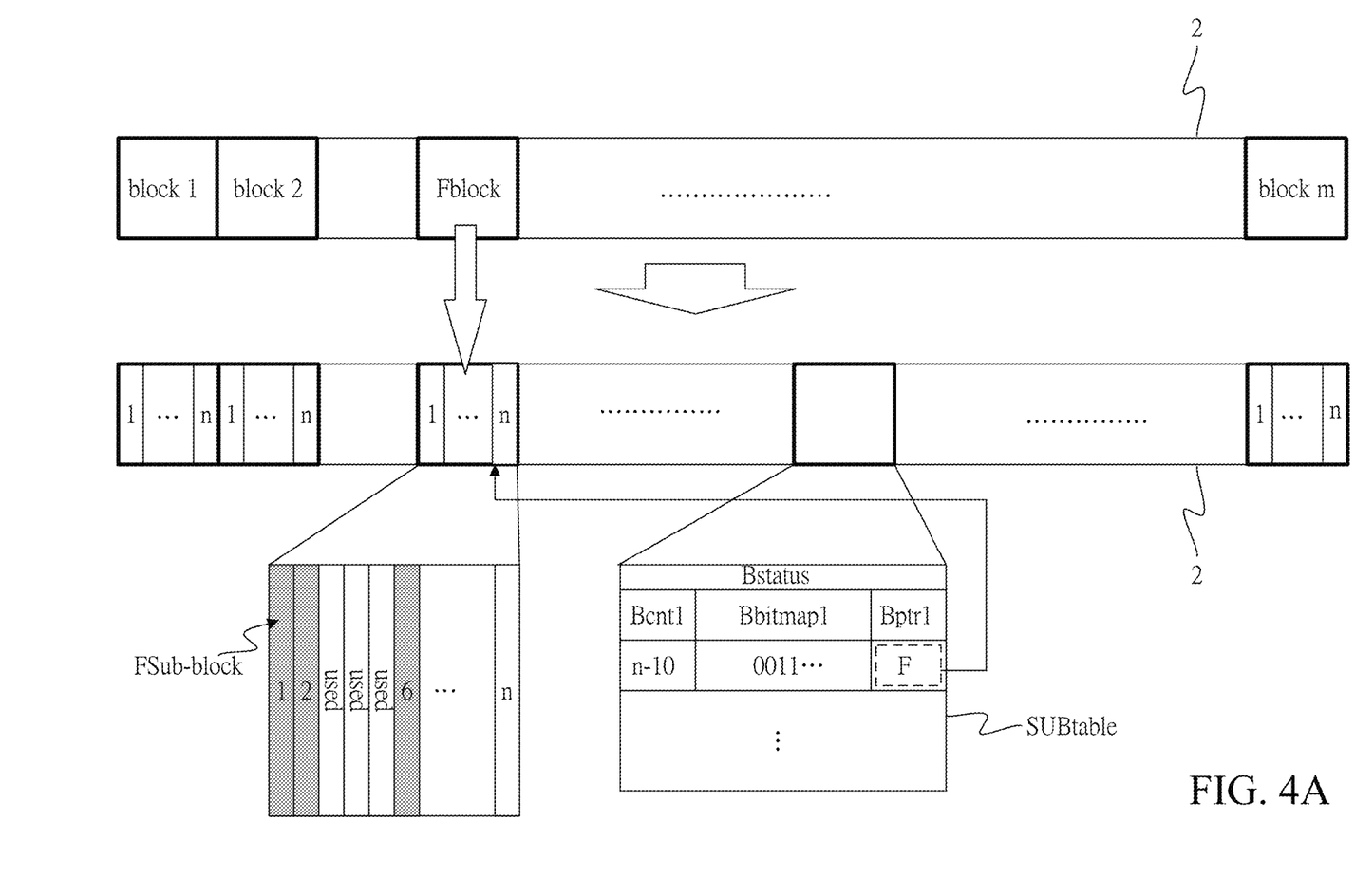
FIGS. 4A and 4B are schematic views illustrating how a byte addressable storing system according to a fourth embodiment of the present invention stores data.
Figure 4B:
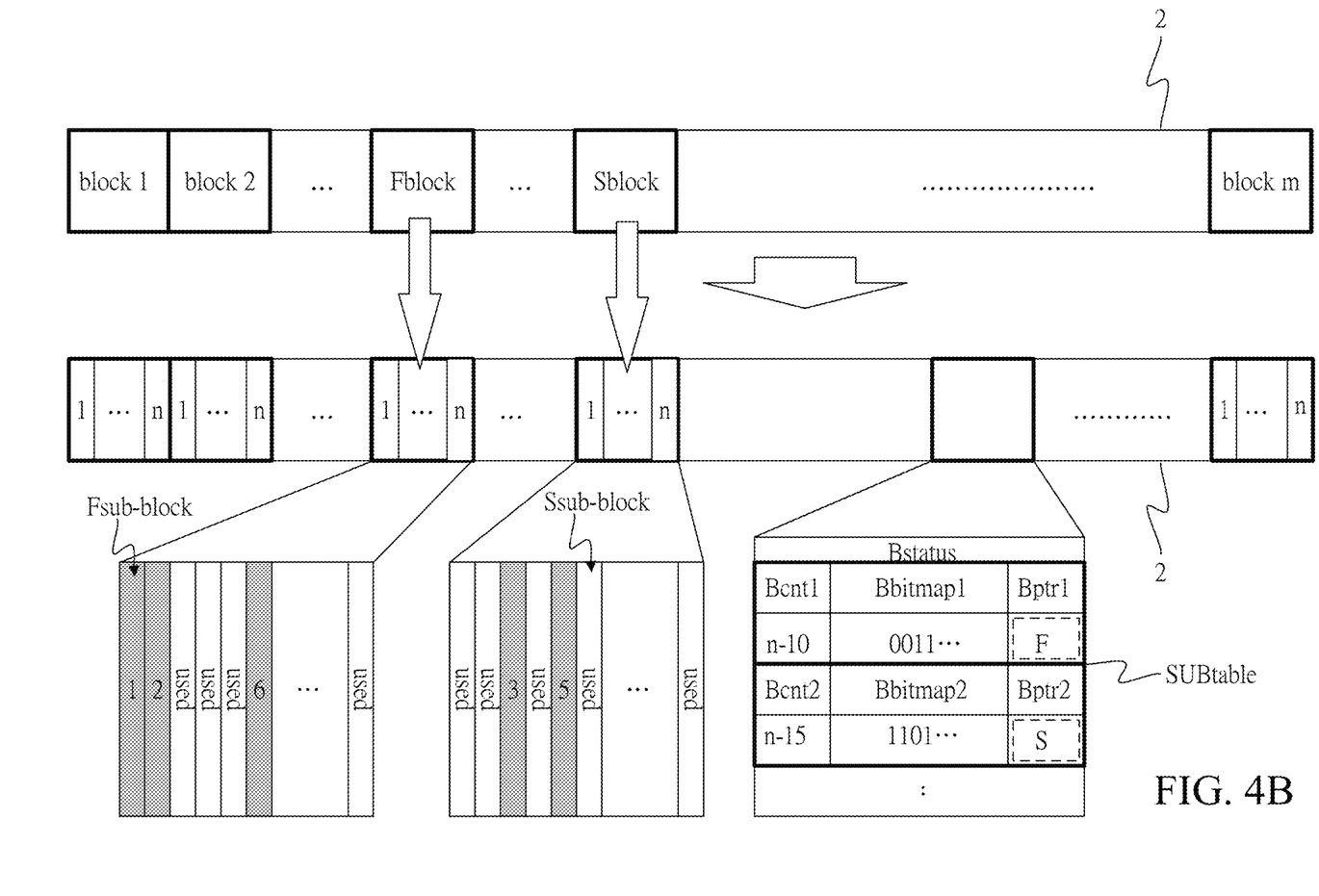

Referring to FIGS. 4A and 4B, there are shown schematic views illustrating how the byte addressable storing system 1 according to a fourth embodiment of the present invention stores data. It should be particularly appreciated that, the fourth embodiment has the same system architecture and connection environment as the aforesaid embodiments. Therefore, elements bearing the same reference numerals have also the same functions and will not be further described herein. The fourth embodiment is mainly intended to describe how to store data in greater detail.

Refer firstly to FIG. 4A. Similarly, the processing unit 13 firstly defines a plurality of blocks blocks 1~m in the byte addressable storing device 2. The plurality of blocks blocks 1~m includes a first block Fblock, and the first block Fblock is divided into a plurality of first sub-blocks Fsub-blocks 1~n. The sub-block using status table SUBtable has a first sub-block number field Bcnt1, a first sub-block bitmap Bbitmap1 and a first sub-block block pointer Bptr1 that are related to the first block Fblock. The first sub-block number field Bcnt1 is configured to record the number of usable sub-blocks of the first sub-blocks Fsub-blocks 1~n. The first sub-block bitmap Bbitmap1 is configured to record using statuses of the first sub-blocks Fsub-blocks 1~n. The first sub-block block pointer Bptr1 is configured to point to the first block Fblock. The processing unit 13 determines that there are inconsecutive usable spaces Fsub-blocks 1, 2, and 6 in the first block Fblock according to the content of the sub-block using status table SUBtable, and then directly stores the file into the first sub-blocks Fsub-blocks 1, 2 and 6 non-sequentially through byte addressing.

Refer to FIG. 4B. Specifically, the plurality of blocks blocks 1~m further comprises a second block Sblock, and the second block Sblock is divided into a plurality of second sub-blocks Ssub-blocks 1~n. The sub-block using status table SUBtable has a second sub-block number field Bcnt2, a second sub-block bitmap Bbitmap2 and a second sub-block block pointer Bptr2 that are related to the second block Sblock.

The second sub-block number field Bcnt2 is configured to record the number of usable sub-blocks of the second sub-blocks Ssub-blocks 1~n. The second sub-block bitmap Bbitmap2 is configured to record using statuses of the second sub-blocks Ssub-blocks 1~n. The second sub-block block pointer Bptr2 is configured to point to the second block Sblock. The processing unit 13 determines that there are inconsecutive usable spaces Fsub-blocks 1, 2 and 6 and Ssub-blocks 3 and 5 in the first block Fblock and the second block Sblock according to the content of the sub-block using status table SUBtable, and directly stores the file into the first sub-blocks Fsub-blocks 1, 2 and 6 and Ssub-blocks 3 and 5 non-sequentially through byte addressing.

Figure 5A:
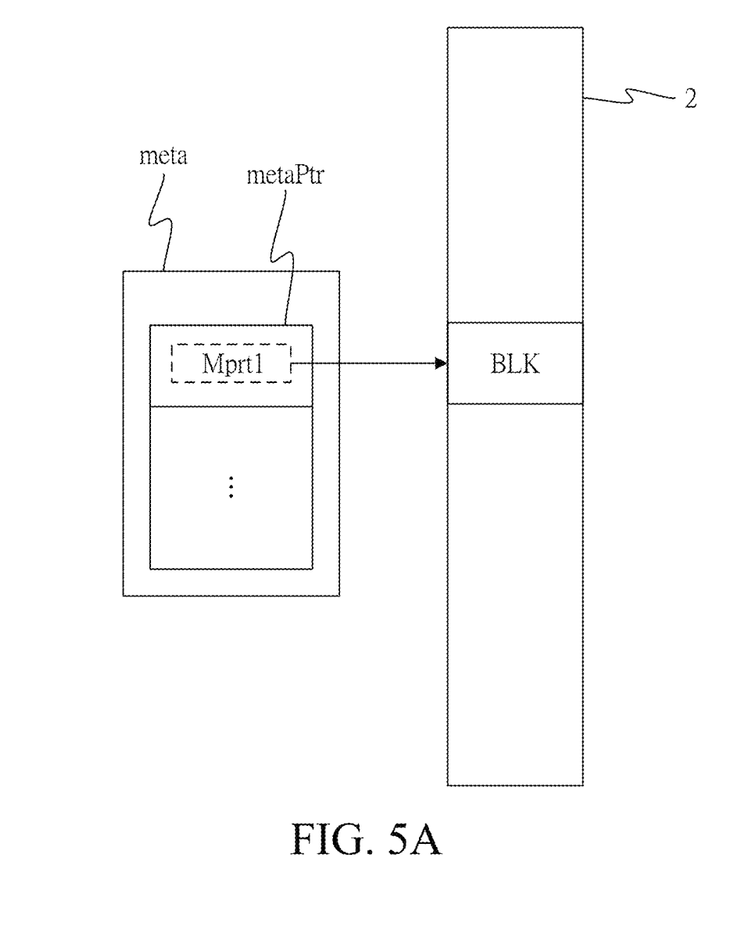
FIGS. 5A and 5B are schematic views illustrating multi-level record data of metadata in a byte addressable storing system according to a fifth embodiment of the present invention.
Figure 5B:
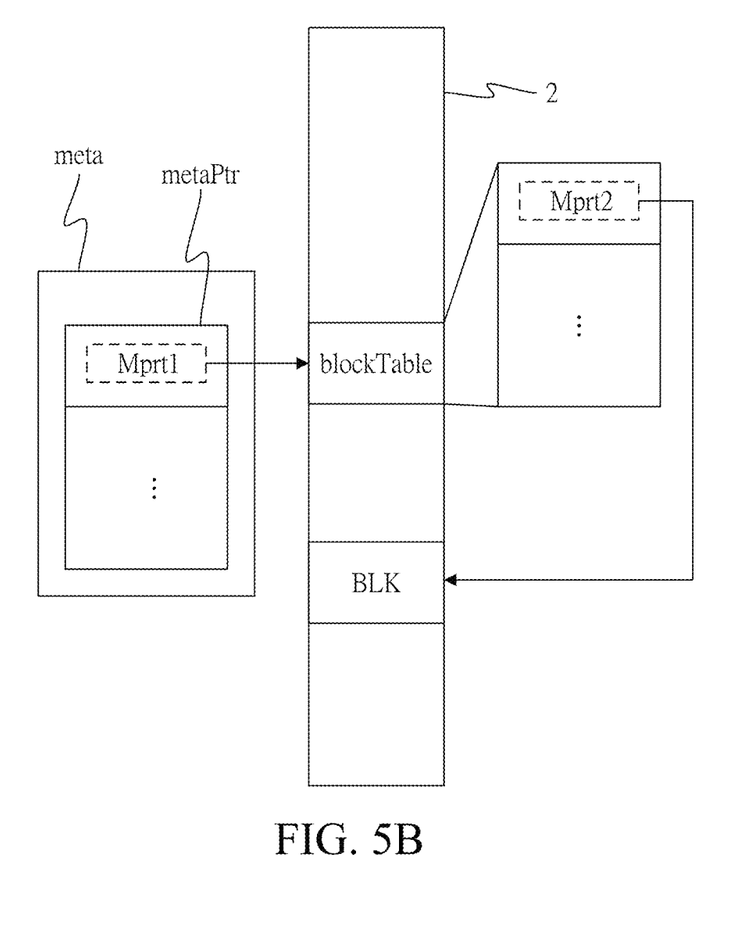

Referring to FIGS. 5A and 5B, there are shown schematic views illustrating how the byte addressable storing system 1 according to a fifth embodiment of the present invention records metadata in a multi-level manner. It should be particularly appreciated that, the fifth embodiment has the same system architecture and connection environment as the aforesaid embodiments. Therefore, elements bearing the same reference numerals have also the same functions and will not be further described herein. The fifth embodiment is mainly intended to describe how to store and record data in a dynamic and multi-level manner.

Specifically, the processing unit 13 creates a metadata meta at the same time when a file is created. The metadata meta has a metadata block pointer metaPtr, and the metadata block pointer metaPtr has a first pointing field Mptr1. Then, the processing unit 13 firstly determines a file size (not depicted) of the file to be stored, pre-allocates a plurality of blocks of the byte addressable storing device 2 to the file according to the file size, and points the first pointing field Mptr1 to the allocated blocks BLK.

Further speaking, the aforesaid step of "pointing the first pointing field Mptr1 to the allocated blocks" may be, depending on the file size, dynamically (as shown in FIG. 5A) and directly pointing the first pointing field Mptr1 to one of the blocks; or dynamically (as shown in FIG. 5B) pointing the first pointing field Mptr1 to a block table blockTable. The blockTable has a second pointing field Mptr2. The second pointing field Mptr2 points to one of the blocks.

Figure 6:
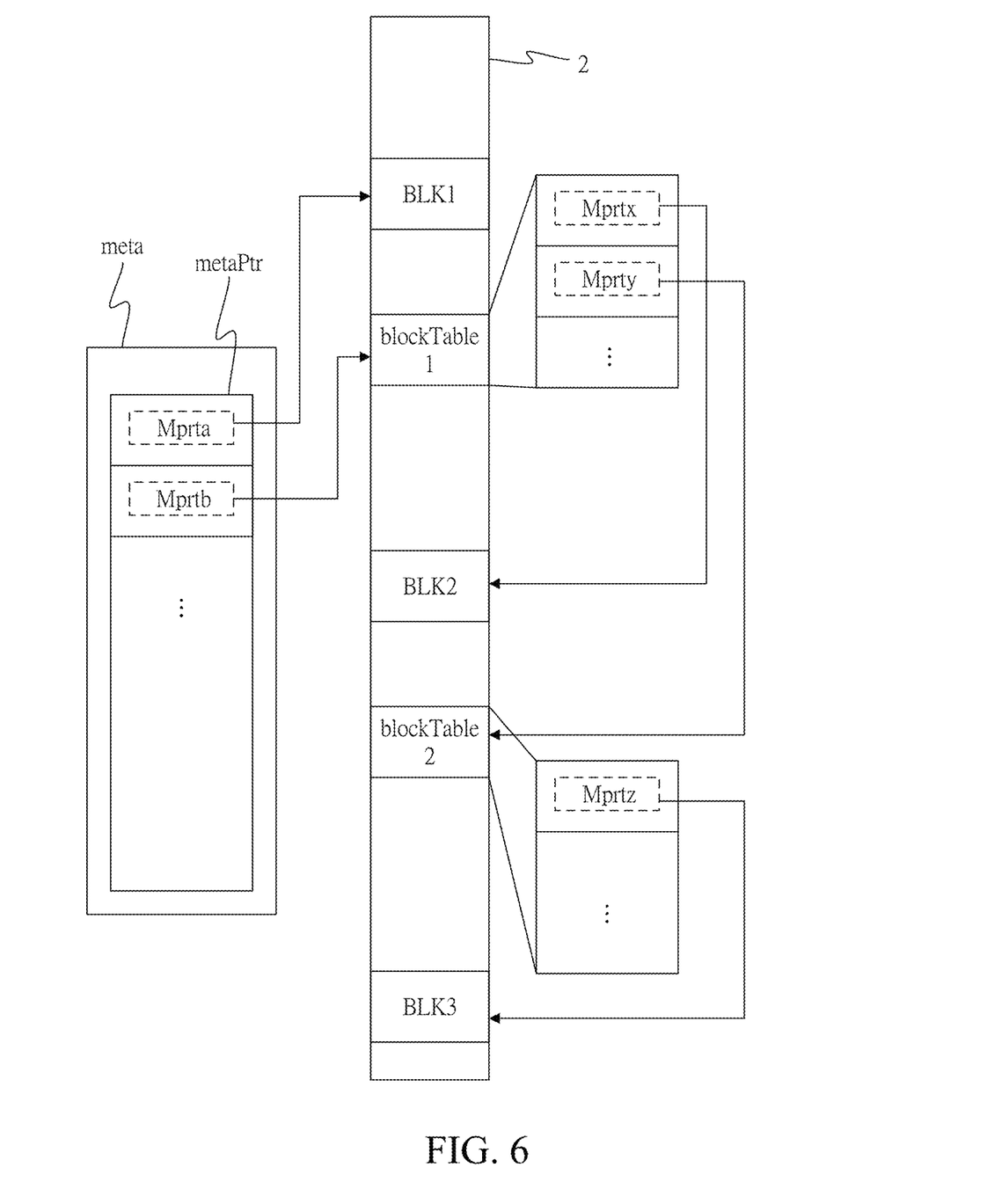
FIG. 6 is a schematic view illustrating multi-level record data of metadata in a byte addressable storing system according to a sixth embodiment of the present invention.

Referring to FIG. 6, there is shown a schematic view illustrating how the byte addressable storing system 1 according to a sixth embodiment of the present invention records metadata in a multi-level manner. It should be particularly appreciated that, the sixth embodiment has the same system architecture and connection environment as the aforesaid embodiments. Therefore, elements bearing the same reference numerals have also the same functions and will not be further described herein. The sixth embodiment is mainly intended to describe how to store and record data in a dynamic and multi-level manner in greater detail.

Specifically, the processing unit 13 creates a metadata meta at the same time when a file is created. The metadata meta has a metadata block pointer metaPtr, and the metadata block pointer metaPtr has a plurality of pointing fields Mptra, Mptrb and so on. Then, the processing unit 13 firstly determines a file size of the file to be stored, pre-allocates a plurality of blocks of the byte addressable storing device 2 to the file according to the file size, and points the pointing field to the allocated blocks.

Similarly, further speaking, the aforesaid step of "pointing the pointing field to the allocated blocks" may be, depending on the file size, dynamically (as shown) and directly pointing the pointing field Mptra to a block BLK1; and meanwhile, dynamically (as shown) pointing the pointing field Mptrb to a block table blockTable1. The block table blockTable1 has a plurality of pointing fields Mptrx, Mptry and so on.

The pointing field Mptrx directly points to a block BLK2, and the pointing field Mptry points to a block table blockTable2. The block table blockTable2 has a plurality of pointing fields Mptrz, and the pointing field Mptrz directly points to a block BLK3.

It should be particularly appreciated that, the metadata block pointer metaPtr of the present invention dynamically adjusts between "directly pointing to a block" or "indirectly pointing to a block table" depending on the file size, and the blocks with at least three different sizes. In this way, the byte addressable storing system of the present invention will not be limited by the fixed block pointing manner of the conventional index-type file system, and by means of dynamic pointing and blocks having different sizes, allows for more flexible use of spaces.

According to the above descriptions, in the byte addressable storing system of the present invention, a more efficient file storing mechanism is used in combination with a byte addressable storing device to improve the file accessing efficiency and to make an improvement on the drawbacks of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A byte addressable storing system for a byte addressable storing device, comprising:
   a data transmission interface connected with the byte addressable storing device; and
   a processing unit, being configured to access the byte addressable storing device via the data transmission interface, and create a first primary metadata table, a first secondary metadata table, a second secondary metadata table and an indirect metadata matching table in the byte addressable storing device, wherein the first primary metadata table records a first metadata storing status of the first secondary metadata table and a second metadata storing status of the second secondary metadata table;
   wherein the processing unit is further configured to:
      determine that the first secondary metadata table has a single used metadata item according to the first metadata storing status;
      determine that the second secondary metadata table has an unused metadata item according to the second metadata storing status;
      transfer the single used metadata item of the first secondary metadata table into the unused metadata item of the second secondary metadata table;
      record the single used metadata item of the first secondary metadata table and the unused metadata item of the second secondary metadata table into the indirect metadata matching table correspondingly; and
      remove the first secondary metadata table.

2. The byte addressable storing system as claimed in claim 1, wherein the first primary metadata table further comprises a full-domain metadata number field, a front data table pointer and a back data table pointer, the full-domain metadata number field is configured to record the number of usable metadata of the byte addressable storing device, the front data table pointer is configured to point to a block for a second primary metadata table in the byte addressable storing device, and the back data table pointer is configured to point to a block for a third primary metadata table in the byte addressable storing device.

3. The byte addressable storing system as claimed in claim 1, wherein the first metadata storing status has a first metadata number field, a first metadata bitmap and a first metadata table block pointer, the first metadata number field is configured to record the number of usable metadata comprised in the first secondary metadata table, the first metadata bitmap is configured to record a metadata using status of the first secondary metadata table, the first metadata table block pointer points to a block for the first secondary metadata table in the byte addressable storing device, the second metadata storing status has a second metadata number field, a second metadata bitmap and a second metadata table block pointer, the second metadata number field is configured to record the number of usable metadata comprised in the second secondary metadata table, the second metadata bitmap is configured to record a metadata using status of the second secondary metadata table, the second metadata table block pointer points to a block for the second secondary metadata table in the byte addressable storing device, and the processing unit is configured to determine that the first secondary metadata table has the single used metadata item according to the first metadata number field of the first metadata storing status and to determine that the second secondary metadata table has the unused metadata item according to the second metadata number field of the second metadata storing status.

4. The byte addressable storing system as claimed in claim 1, wherein the indirect metadata matching table has a source address and a corresponding destination address, the source address points to the single used metadata item, and the destination address points to the unused metadata item.

5. A byte addressable storing system for a byte addressable storing device, comprising:
- a data transmission interface connected with the byte addressable storing device; and
- a processing unit, being configured to access the byte addressable storing device via the data transmission interface, and create a first primary metadata table and a first secondary metadata table in the byte addressable storing device, wherein the first primary metadata table records a first metadata storing status of the first secondary metadata table and the first primary metadata table comprises a full-domain metadata number field, a front data table pointer and a back data table pointer, the full-domain metadata number field is configured to record the number of usable metadata of the byte addressable storing device, the front data table pointer is configured to record a block for a second primary metadata table in the byte addressable storing device, and the back data table pointer is configured to record a block for a third primary metadata table in the byte addressable storing device;
- wherein the processing unit is further configured to:
  - determine that the first secondary metadata table does not have a usable metadata item according to the first metadata storing status; and
  - add a second metadata storing status into the first primary metadata table and create a second secondary metadata table correspondingly.

6. A byte addressable storing system for a byte addressable storing device, comprising:
- a data transmission interface connected with the byte addressable storing device; and
- a processing unit, being configured to access the byte addressable storing device via the data transmission interface, and create a first primary metadata table and a first secondary metadata table in the byte addressable storing device, wherein the first primary metadata table records a first metadata storing status of the first secondary metadata table, the first meta data storing status has a first metadata number field, a first metadata bitmap and a first metadata table block pointer, the first metadata number field is configured to record the number of usable metadata comprised in the first secondary metadata table, the first metadata bitmap is configured to record a metadata using status of the first secondary metadata table, the first metadata table block pointer is configured to record a block for the first secondary metadata table in the byte addressable storing device;
- wherein the processing unit is further configured to:
  - determine that the first secondary metadata table does not have a usable metadata item according to the first metadata number field of the first metadata storing status; and
  - add a second metadata storing status into the first primary metadata table and create a second secondary metadata table correspondingly, the second metadata storing status including a second metadata number field, a second metadata bitmap and a second metadata table block pointer, the second metadata number field is configured to record the number of usable metadata comprised in the second secondary metadata table, the second metadata bitmap is configured to record a metadata using status of the second secondary metadata table, the second metadata table block pointer is configured to record a block for the second secondary metadata table in the byte addressable storing device.

* * * * *